(12) United States Patent
Wong

(10) Patent No.: US 7,930,973 B2
(45) Date of Patent: Apr. 26, 2011

(54) AUTOMATED COOKING APPARATUS

(76) Inventor: Godfrey S. Wong, San Francisco, CA (US)

( * ) Notice: Subject to any disclaimer, the term of this patent is extended or adjusted under 35 U.S.C. 154(b) by 756 days.

(21) Appl. No.: 11/983,916

(22) Filed: Nov. 13, 2007

(65) Prior Publication Data

US 2008/0110347 A1    May 15, 2008

Related U.S. Application Data

(60) Provisional application No. 60/857,875, filed on Nov. 10, 2006.

(51) Int. Cl.
*A47J 27/14* (2006.01)
*A47J 43/00* (2006.01)

(52) U.S. Cl. .............. 99/334; 99/348; 99/357; 366/144; 366/185

(58) Field of Classification Search .................... 99/334, 99/348, 357; 366/144, 146, 147, 185
See application file for complete search history.

(56) References Cited

U.S. PATENT DOCUMENTS

| 4,503,502 | A | * | 3/1985 | Chapin | 700/90 |
| 4,700,617 | A | * | 10/1987 | Lee et al. | 99/327 |
| 4,821,631 | A | | 4/1989 | Wong | |
| 4,893,939 | A | * | 1/1990 | Burk et al. | 366/224 |
| 4,919,950 | A | | 4/1990 | Mak | |
| 4,922,435 | A | * | 5/1990 | Cahlander et al. | 700/247 |
| 5,088,390 | A | * | 2/1992 | Wong et al. | 99/327 |
| 6,647,864 | B1 | | 11/2003 | Fang | |
| 6,843,166 | B1 | * | 1/2005 | Li | 99/327 |
| 7,174,830 | B1 | * | 2/2007 | Dong | 99/334 |

* cited by examiner

*Primary Examiner* — Reginald L Alexander

(57) ABSTRACT

An automated cooking apparatus to replicate a chef's stir-frying cooking skills on using a utensil, a combination of using a utensil and wok-flip mechanism, or a wok-flip mechanism to enhance cooking results.

20 Claims, 2 Drawing Sheets

AUTOMATED COOKING APPARATUS

CROSS-REFERENCE TO RELATED APPLICATIONS

This application claims the benefit of U.S. Provisional Patent Application No. 60/857,875, filed 10 Nov. 2006 by the present inventor, the disclosure of which application is hereby incorporated by reference.

FIELD OF INVENTION

This invention generally relates to an automated cooking apparatus, and more specifically, an automated apparatus for cooking stir-fried meals

BACKGROUND OF THE INVENTION

In Asian cooking, especially Chinese cuisine, stir-fry cooking is commonly used. There have been U.S. patents related to stir-fry cooking, such as U.S. Pat. No. 4,503,502 to Chapin, U.S. Pat. No. 4,700,617 to Lee et al., U.S. Pat. No. 4,919,950 to Mak, U.S. Pat. No. 6,647,864 to Fang, U.S. Pat. No. 4,821,631 to Wong et al., U.S. Pat. No. 5,088,390 to Wong et al., U.S. Pat. No. 6,843,166 to Li. However, there is a need to improve on these mechanical stir-fry devices or methods. The present invention is aimed toward providing the improvement.

SUMMARY OF THE INVENTION

The present invention provides an automated cooking apparatus, comprising: a base and structural assembly having a height adjustable pole; a stir mechanism mechanically supported by the pole; and a wok-flip mechanism mechanically supported by the pole, wherein said stir mechanism comprises (a) a plurality of motors adapted for controlling lateral, raising, and lowering movements of said stir mechanism, (b) an elongated member for connecting to a utensil for stir-fry cooking, and (c) multiple motors for extending, retracting, and turning the elongated member, and wherein said wok-flip mechanism comprises a plurality of linear motion actuators for tilting a wok up and down to generate velocity capable of propelling food into the air in a cooking cycle thereby increasing food cooking efficiency.

There are several objects and advantages of the present invention:
(a) to provide an automated cooking apparatus to replicate a chefs stir-frying skills;
(b) to provide an automated cooking apparatus capable of stir-frying with a utensil alone, combining stir-frying with a utensil and wok-flip movement, or by wok-flip movement alone;
(c) to provide an automated cooking apparatus capable of variable stirring and flipping movement;
(d) to provide an automated cooking apparatus capable of cooking food uniformly, consistently and efficiently;
(d) to provide an automated cooking apparatus that operates with common scoop and wok parts as used by chefs who are skilled in the art of Chinese cooking;
(e) to provide an automated cooking apparatus that can be used with ordinary Chinese cooking stovetops commonly found in Chinese restaurants;
(f) to provide an automated cooking apparatus that can be operated as a portable unit or being installed on floor, wall, or ceiling with appropriate modifications; and
(g) to provide an automated cooking apparatus that can be used to substitute for a chef.

DETAILED DESCRIPTION OF THE PREFERRED EMBODIMENTS

Figure 1:
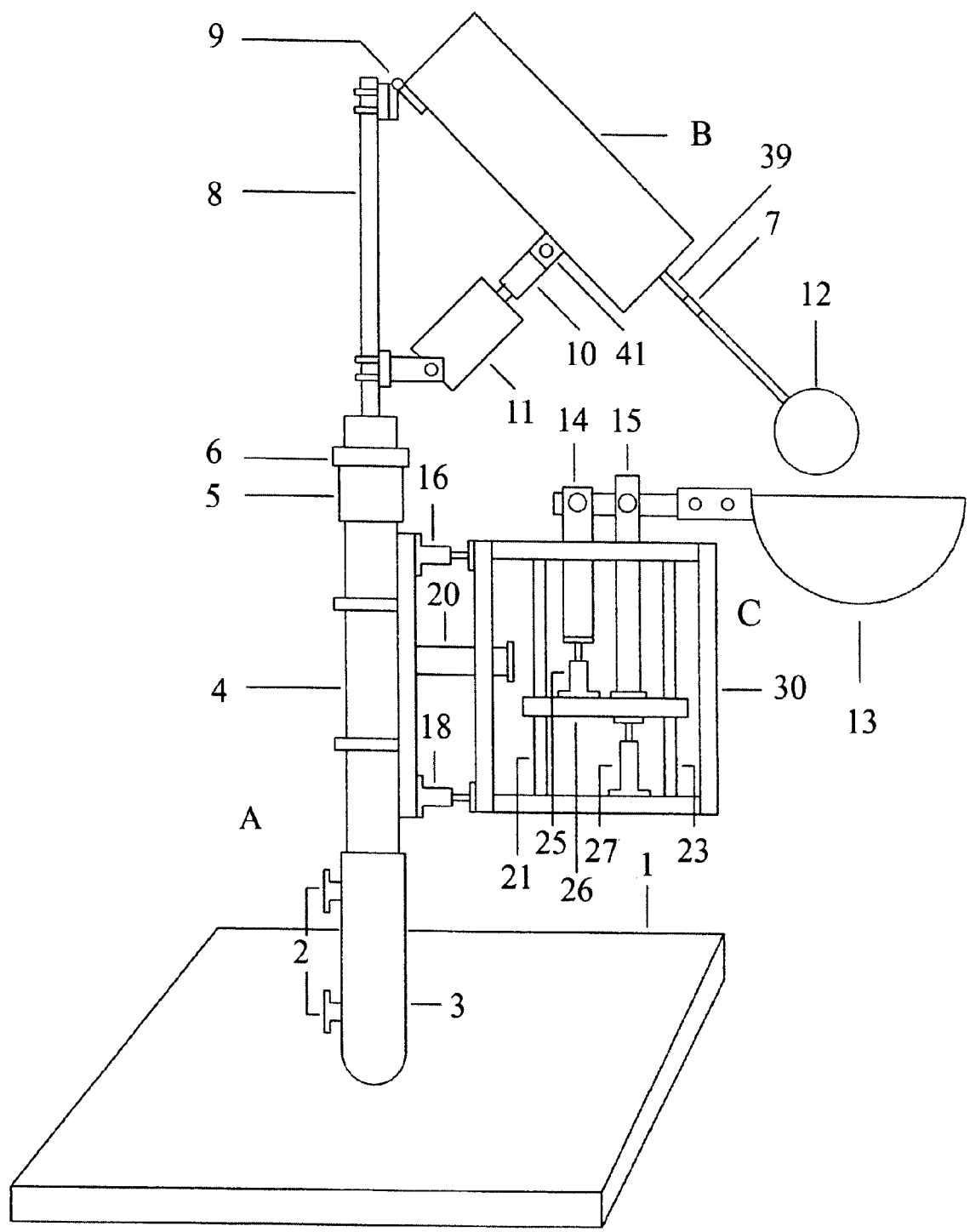
FIG. 1 is a side view of one embodiment of the present invention.

Referring to FIG. 1, there is disclosed an automated cooking apparatus comprising a base and structural assembly A, a stir mechanism B, and a wok-flip mechanism C. Assembly A comprises of a base 1 with metal sleeve 3 attached to it. Knobs 2 clamp oblong body 4. Raising or lowering oblong body 4 can adjust height of the apparatus. Motor 5 drives gearbox and bearings assembly 6. Its output turns shaft 8 for lateral motion. Hinge 9 connects shaft 8 and stir mechanism B. Motor 11 drives threaded rod mechanism 10, which is connected to bracket 41, to raise and lower stir mechanism B. Shaft 39 connects to spring coupler 7, which in turn connects to scoop 12. Spring coupler 7 flexes when scoop 12 scrapes near or along the inside surface of wok 13.

Figure 2:
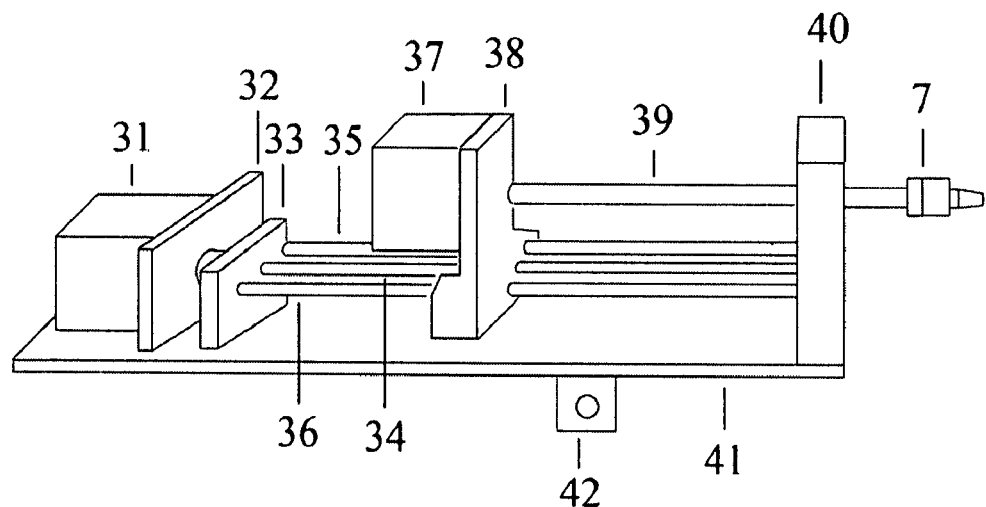
FIG. 2 illustrates an embodiment of a stir mechanism according to the present invention.

FIG. 2 illustrates an embodiment of the stir mechanism with the top cover removed. Motor 31 attaches to mount plate 32. Slides 35, 36 and threaded rod 34 are connected to end plate 33 on one end and front plate 40 on the other end. Bracket 42 is mounted on the underside of base plate 41. Motor 37 attaches to rider block 38, which rides on threaded rod 34 and slides 35, 36. With motor 31 turning threaded rod 34, rider block 38 travels back and forth to extend and retract shaft 39. Motor 37 also can turn shaft 39, spring coupler 7 and scoop 12, which is not shown in the drawing.

Figure 3:
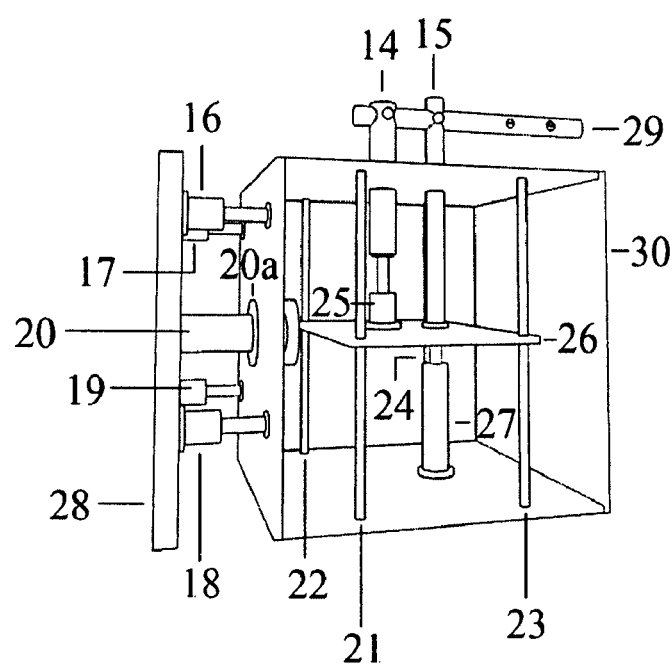
FIG. 3 is a perspective view of the wok-flip mechanism.

FIG. 3 shows an embodiment of the wok-flip mechanism. The whole mechanism attaches to mount block 28, which in turn attaches to oblong body 4. Chassis 30 rides on bearing 20a that slides on shaft 20. Bearing 20a allows swivel movement for chassis 30. Linear motion actuators 16, 17, 18, 19 provide the force to make chassis 30 swivel at various angles. They also serve as anchor points to keep chassis 30 stable. Inside chassis 30, guide block 26 rides on guide rails 21, 22, 23, 24. Linear motion actuator 27 provides lifting and lowering motion to components mounted on top of guide block 26, they consist of pivot rod 15 and linear motion actuator 25 that drives actuate rod 14. Tilt rod 29 is pivoted at pivot rod 15. One end of tilt rod 29 is connected to actuate rod 14 and the other end is attached with wok 13, which is not shown in the drawing. The preferred embodiment shows a type of wok, other types can be used with the present invention with suitable machined clamps to clamp them to tilt rod 29.

Operation—FIGS. 1, 2, 3

FIG. 1 illustrates the automated cooking apparatus comprising a base and structural assembly A, a stir mechanism B, and a wok-flip mechanism C. Before use, the whole apparatus structure is adjusted for height and reach to match with a partnering stovetop. The raising or lowering oblong body 4 adjusts the height of the automated cooking apparatus and is tightened with knobs 2 when the desired height is found. The reach is adjusted by moving the whole apparatus structure until a position is found to place wok 13 on a burner ring of the stovetop. Preferably, the stovetop is a Chinese cooking stovetop.

For clarity, operation of the cooking apparatus is shown in three modes:

(1) Stir-Fry with a Utensil in a Stationary Wok.

Stir mechanism B positions scoop 12 above wok 13. Oil is added to wok 13. When wok 13 is heated, food, preferably in the form of pieces and/or slices, is poured into wok 13. Scoop 12 is lowered to begin stirring. Motor 5 drives gearbox and bearings assembly 6. Its output turns shaft 8 to move stir mechanism B laterally. Motor 11 drives threaded rod mechanism 10, which is connected to bracket 41, to raise and lower stir mechanism B. The combination of rising and lowering motion, the retracting and extending of shaft 39, and lateral turnings of shaft 8 control scoop 12 to stir food following the shape of the concave-shaped wok. When scoop 12 scrapes on wok 13 either as part of the stir-fry process or to scoop up food after it is cooked, spring coupler 7 flexes to provide some flexibility to scoop 12. It also works as a safeguard to against possible damage to wok 13 or the cooking apparatus. There is no limit on the stirring steps for scoop 12. The coordinated movements of motors 5, 11, 31, 37 will control where and when scoop 12 should move or stop. Small movements can affect results of the cooked food even when the same ingredients are used because different chefs do not have the same stir-fry skills. It is desirable for the present invention to replicate different stir-fry skills. Multiple sensors are used to monitor the cooking apparatus to ensure movements of the parts are restricted to what have been programmed. After the food is cooked at preset time, stir mechanism B raises and swings to one side away from wok 13, and shaft 39 retracts to the rest position waiting for the next cooking cycle.

FIG. 2 shows the operation of telescopic movement inside stir mechanism B. Motor 31 turns threaded rod 34. Motor 37 mounts to rider block 38, which rides on threaded rod 34 and slides 35, 36. The turning of threaded rod 34 determines stroke length of shaft 39. Motor 37 controls when scoop 12 is turned and for how many degrees.

(2) Stir-Fry with Utensil and Wok-Flip Combination.

The operation of base and structural assembly A and stir mechanism B is stated in preceding paragraph (1). With the addition of FIG. 3 wok-flip mechanism, linear motion actuator 27 pushes guide block 26 upward to lift wok 13 from its burner ring of the stovetop. Linear motion actuator 25 pulls actuate rod 14 downward thereby lifting tilt rod 29 at wok 13 end. The lifting motion generates velocity to propel food particles into the air, linear motion actuator 25 will then push actuate rod 14 to return tilt rod 29 to the original position before food particles fall back into wok 13. Lifting wok 13 will separate it from burner ring but does not remove it from heating source completely. After each flip, wok 13 will return to sit on the burner ring. Linear motion actuators 16, 17, 18, 19 provide additional tilt angles for wok 13 as if a chef would flip the wok from different angles to enhance cooking results. The wok-flip movements will continue until the end of a cooking cycle whereby wok 13 will return to rest on the burner ring, stir mechanism B raises and swings to one side away from wok 13, and shaft 39 retracts to the rest position. Stir mechanism B will synchronize with the plurality of linear motion actuators of wok-flip mechanism to produce the desirable results of stir-fry cooking.

(3) Stir-Fry with Wok-Flip Movement.

Stir mechanism B swings to one side and parks there away from wok 13. Operation of FIG. 3 wok-flip mechanism is stated in preceding paragraph (2). To elaborate further, push-full motion from linear motion actuators 16, 17, 18, 19, individually and collectively, create different tilting angles and shifting wok 13 back and forth. In combination with movements generated from linear motion actuators 25, 27, food particles in wok 13 can be tossed in multiple angles. Although no utensil is used for stirring, stir-frying effects is achieved by continuous wok-flip movement. However, most stir-fry cooking is done by using one of the methods stated in preceding paragraphs (1) and (2).

It should be evident that this disclosure is by way of example and that various changes may be made by adding, modifying or eliminating details without departing from the scope contained in this disclosure. The invention is therefore not limited to particular details of this disclosure except to the extent that the following claims are necessarily so limited.

I claim:

1. A cooking apparatus, comprising:
a base and a structural assembly attached to the base, said structural assembly comprising a sleeve and a height adjustable pole having a first portion and a second potion, the first portion being slidably secured in the sleeve; and
a stir mechanism and a flip mechanism mechanically supported by the second portion of the pole, said flip mechanism adapted for flipping a wok;
wherein said stir mechanism comprises (a) a shaft means capable of extending and retracting a utensil for stir-fry cooking, said shaft means having a first part and a second part, the first part for connecting to the utensil, (b) a device comprising a first motor connected to the second part of the shaft means for extending and retracting the shaft means, and a second motor connected to the second part of the shaft means for turning the shaft means, (c) a third motor attached to the device for moving the device laterally and thereby moving the stir mechanism laterally, and (d) a fourth motor attached to the device for controlling the raising and lowering movements of the device and thereby raising and lowering the stir mechanism, wherein said stir mechanism is capable of moving laterally by the third motor and/or vertically by the fourth motor; and
wherein said flip mechanism comprises (a) a rod having a first part and a second part, said first part of the rod adapted for attaching to a wok, and (b) a linear motion actuator attached to the second part of the rod for tilting the wok up and down to generate velocity capable of propelling food into the air in a cooking cycle thereby increasing food cooking efficiency.

2. The cooking apparatus of claim 1, wherein said third motor is adapted for moving the stir mechanism laterally relative to the flip mechanism.

3. The cooking apparatus of claim 2, wherein the height adjustable pole is oblong.

4. The cooking apparatus of claim 2, further comprising the utensil for stir-fry cooking, wherein the shaft means is connected to the utensil for stir-fry cooking.

5. The cooking apparatus of claim 2, wherein the linear motion actuator of the flip mechanism is connected to a wok or pan.

6. The cooking apparatus of claim 2, wherein said first, second, third and fourth motors are adapted for controlling the utensil to generate multiple stir-fry patterns that substantially follow the inside surface of the wok.

7. The cooking apparatus of claim 6, further comprising the wok attached to the first part of the rod of the flip mechanism, wherein the inside surface of the wok is concave.

8. The cooking apparatus of claim 4, wherein the utensil is a scoop.

9. The cooking apparatus of claim 5 further comprising a spring coupler connected to the first part of the shaft means, wherein the shaft means is connected to the utensil via the spring coupler and wherein the spring coupler provides flexible means that allows said utensil to scrape against the inside surface of the wok to scoop up food without damage to said cooking apparatus and/or the wok.

10. The cooking apparatus of claim 5, further comprising four linear motion actuators attached to the height adjustable pole capable of driving the wok to tilt in different angles and/or move back and forth.

11. The cooking apparatus of claim 2, wherein said stir mechanism can do stir-fry cooking without any movement of the flip mechanism.

12. The cooking apparatus of claim 2, wherein said stir mechanism can do stir-fry cooking with the movement of the flip mechanism.

13. The cooking apparatus of claim 2, wherein said flip mechanism can do stir-fry cooking without the movement of the stir mechanism.

14. The cooking apparatus of claim 2, wherein said stir mechanism and said flip mechanism can be configured as separate cooking apparatuses or a joint cooking apparatus entity.

15. The cooking apparatus of claim 2, wherein said stir mechanism and/or said flip mechanism is operated with a computer capable of controlling the movement of said stir mechanism, the movement of the shaft means and/or the movement of the wok.

16. A cooking apparatus, comprising:
a base and a structural assembly attached to the base, said structural assembly comprising a sleeve and a height adjustable pole having a first portion and a second potion, the first portion being slidably secured in the sleeve;
a stir mechanism and a flip mechanism mechanically supported by the second portion of the pole, said flip mechanism adapted for flipping a wok; and
a utensil for stir-fry cooking;
wherein said stir mechanism comprises (a) an elongated member having a first part and a second part, the first part for connecting to a utensil for stir-fry cooking, (b) a device comprising a first motor connected to the second part of the elongated member for extending and retracting the elongated member, and a second motor connected to the second part of the elongated member for turning the elongated member, (c) a third motor attached to the device for moving the device laterally and thereby moving the stir mechanism laterally, and (d) a fourth motor attached to the device for controlling the raising and lowering movements of the device and thereby raising and lowering the stir mechanism;
wherein said flip mechanism comprises (a) a rod having a first part and a second part, said first part of the rod adapted for attaching to a wok, and (b) a linear motion actuator attached to the second part of the rod for tilting the wok up and down to generate velocity capable of propelling food into the air in a cooking cycle thereby increasing food cooking efficiency; and
wherein the first part of the elongated member is connected to the utensil via a spring coupler.

17. The cooking apparatus of claim 16, wherein the spring coupler provides flexible means that allows said utensil to scrape against the inside surface of the wok to scoop up food without damage to said cooking apparatus and/or the wok.

18. The cooking apparatus of claim 16, further comprising the utensil for stir-fry cooking, wherein the spring coupler is connected to the utensil for stir-fry cooking.

19. The cooking apparatus of claim 16, further comprising a wok or pan connected to the linear motion actuator of the flip mechanism.

20. The cooking apparatus of claim 16, wherein the first, second, third and fourth motors are adapted for controlling the utensil to generate multiple stir-fry patterns that substantially follow the inside surface of the wok.

* * * * *